E. L. JESTER.
EARTHENWARE PRESS.
APPLICATION FILED APR. 17, 1911.
1,103,968.
Patented July 21, 1914.
2 SHEETS—SHEET 1.
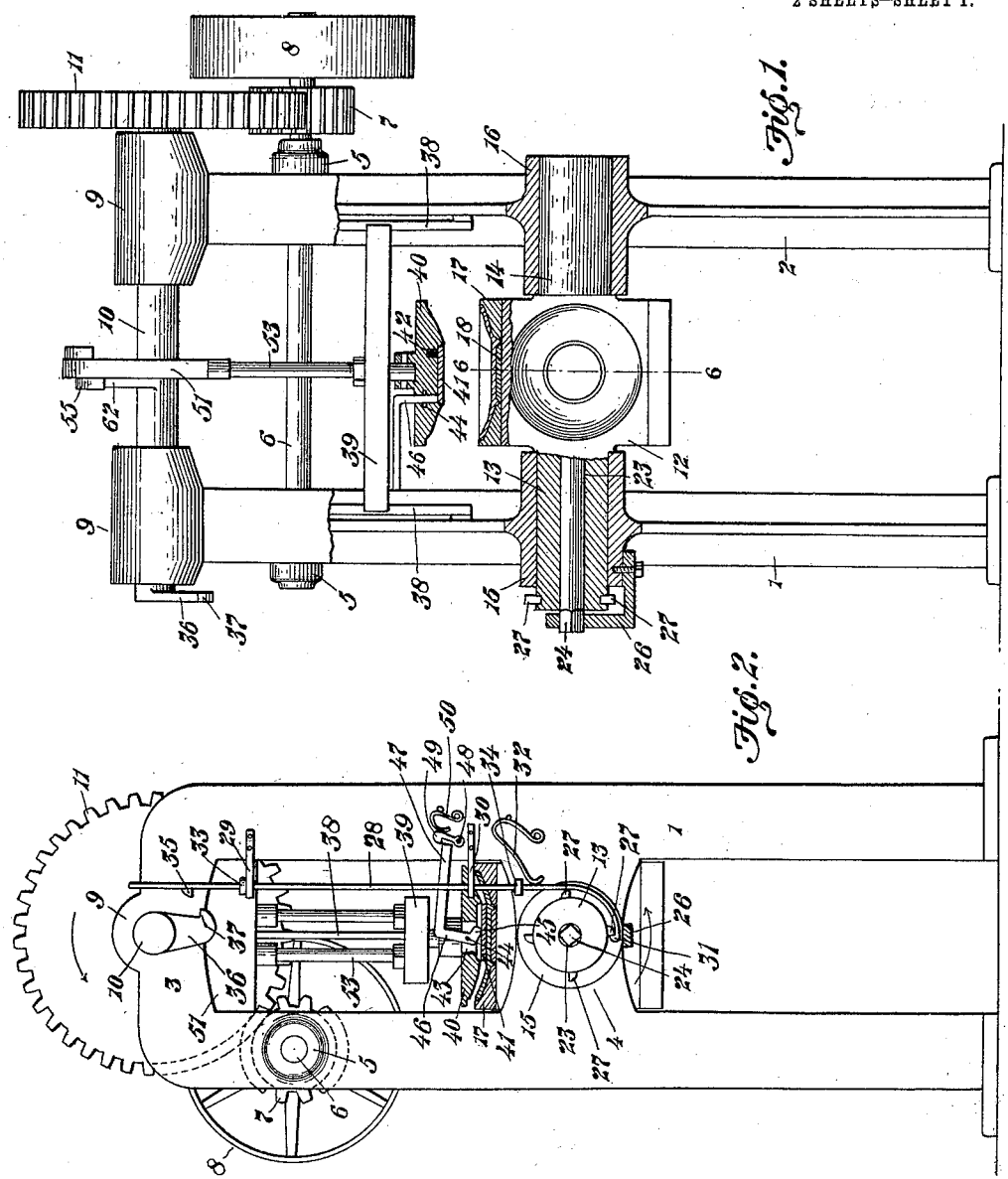
Witnesses
J. H. Bishoff.
Irene Lutz
Inventor
Eugene L. Jester.
By Bond + Miller
Attorneys E. L. JESTER.
EARTHENWARE PRESS.
APPLICATION FILED APR. 17, 1911.
1,103,968.
Patented July 21, 1914.
2 SHEETS—SHEET 2.
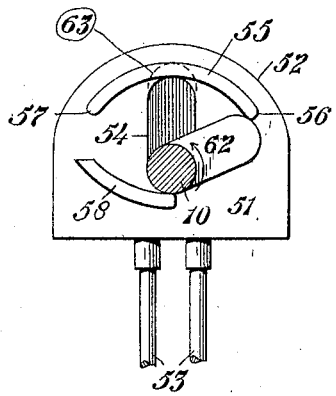
Fig. 3.
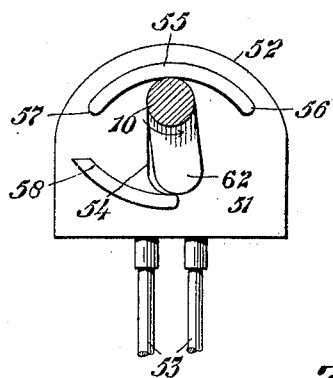
Fig. 4.
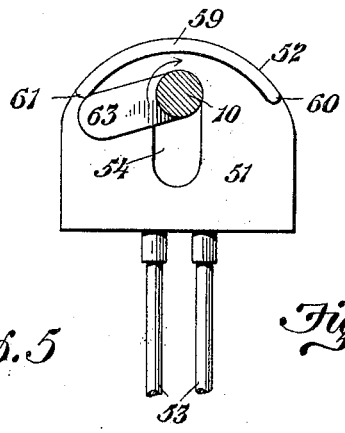
Fig. 5.
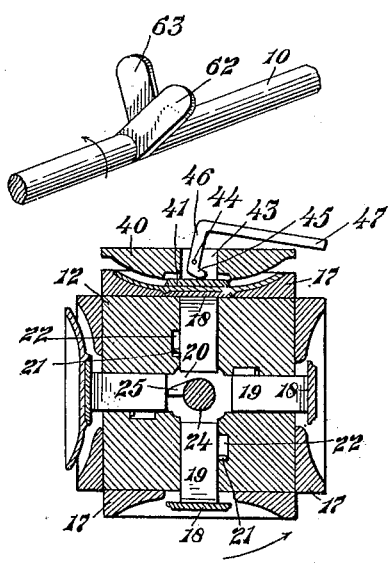
Fig. 10.
Fig. 8.
Fig. 6.
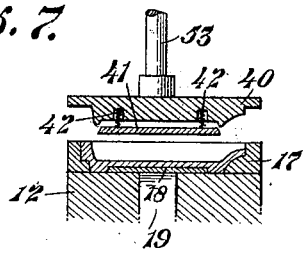
Fig. 7.
Fig. 9.
Inventor
Eugene L. Jester.
Witnesses
J. H. Bishop.
Irene Lutz.
By Bond & Miller
Attorneys

UNITED STATES PATENT OFFICE.

EUGENE L. JESTER, OF EAST LIVERPOOL, OHIO.

EARTHENWARE-PRESS.

1,103,968. Specification of Letters Patent. Patented July 21, 1914.

Application filed April 17, 1911. Serial No. 621,542.

*To all whom it may concern:*

Be it known that I, EUGENE L. JESTER, a citizen of the United States, residing at East Liverpool, in the county of Columbiana and State of Ohio, have invented a new and useful Earthenware-Press, of which the following is a specification.

My improvement relates to that class of earthenware presses especially adapted for the forming of articles of earthenware from clay by the "stiff mud process." That is to say a device embodying my invention is more particularly adapted for working clay containing substantially ten to fifteen per cent. moisture or thereabout. Heretofore earthenware, especially dishes and similar articles, have usually been made by what is called the soft mud process, or by what is called the dust process, which involves the use of very great pressure upon clay in the form of dust. By my invented construction I propose to form the articles from clay in a state intermediate the soft clay state and the dust state, using clay having sufficient moisture to work readily while being sufficiently stiff to retain the shape of the articles after they have been formed.

While I have hereinabove mentioned dishes as one of the articles for which my invention is particularly adapted, it should be stated that the invention is also adapted for the forming of many other articles from clay by the stiff mud process, stone ware, including jugs and the like, as well as other articles of earthenware being very readily made upon a device of my invention, as will hereinafter be fully explained.

The objects of my invention are to generally improve devices of the character mentioned and to provide an earthenware press adapted for the production of a large output of perfectly formed articles of a superior quality and closer texture with the minimum amount of labor, and with accuracy and thorough efficiency in every respect.

An additional object of the invention is to provide means whereby earthenware articles may be made more uniform in weight, size, shape and quality. Moreover, by means of my invention in carrying out the stiff mud process I am enabled to produce earthenware articles which will possess greater strength and will withstand the biscuit firing in a very superior manner, the quality of the ware after such firing being such as to take the glaze better and more evenly and undergo the gloss-firing in a way to produce better results than have heretofore been possible of attainment.

These objects together with other objects readily apparent to those who are skilled in the art to which this invention belongs I attain by the construction illustrated in the accompanying drawings, although my invention may be embodied in other forms of construction, that illustrated herein being chosen by way of example.

In the drawings Figure 1 is a front elevation of an earthenware press embodying my invention. Fig. 2 is a side elevation of the press. Fig. 3 is an elevation of one side of the reciprocating plunger operating head in its most elevated position. Fig. 4 is an elevation of the same side of said head showing the head in its downward or pressing position. Fig. 5 is an elevation of the other side of said head in the position assumed by the parts just after the pressing operation, when the head is beginning to rise. Fig. 6 is a transverse sectional view through the rotatable die block taken on the line 6—6 of Fig. 1 and showing said block provided with dies appropriate for the making of queensware plates. Fig. 7 is a vertical sectional view through an upper and lower die adapted for use on the same press as illustrated in the other figures, said die being adapted for the formation of one-half of a stone-ware jug. Figs. 8 and 9 are end and side elevations respectively of a stone ware jug made from half jugs as produced by the die illustrated in Fig. 7. Fig. 10 is a fragmentary perspective view of the plunger head operating shaft and its connected arms.

Throughout the several views similar reference numerals indicate similar parts.

The numerals 1 and 2 indicate the left and right-hand side frames constituting the main support for the press. Each of said sides comprises two vertically disposed, spaced upright portions as illustrated in Fig. 2, said portions being connected at their upper ends by the cross-yoke 3 and intermediate their ends by the main bearing support 4. Each of said sides is preferably formed of a single casting, although it will be understood that any suitable frame-work may be employed. Journaled in the bearings 5 on the side frames 1 and 2 is the main power shaft 6 which extends from side to side and extends beyond the frame 2, where said shaft is provided with the fixedly mounted small gear 7 and the drive pulley 8. Extending transversely at the top of the side frames and journaled in bearings 9 on the cross yokes 3 is the shaft 10 which extends beyond the side 2 and is provided with a large gear 11 meshing with the gear 7 heretofore mentioned. The rotatable die block 12 is preferably square in cross-section and provided with four bottom dies, one on each side, as will hereinafter be more fully explained. Said die block extends transversely from side frame to side frame and is provided with the integral heavy trunnions 13 and 14 which are rotatably journaled in appropriate bearings 15 and 16 respectively in the supports 4.

In the drawings, especially in Figs. 1, 2 and 6, I have illustrated the die block as provided with lower dies for the forming of plates. It will be understood that the dies used upon the press will vary in accordance with the articles to be made thereon, the lower die and the upper die, to be hereinafter more fully explained, being appropriately made to form the desired article. Each lower die illustrated in the drawings comprises the outer fixed portion 17 adapted to form the lower outer contour of the plate, and with the projectable bottom 18 which is adapted to form the central bottom portion of the plate. Each of the bottoms 18 is fixedly mounted upon the outer end of a bar 19 which is slidably mounted in the die block and extends through said die block into a central opening 20 therein, the sliding movement of the bar being limited by a lug 21 arranged in a recess 22 in the body of the die block. The opening 20 is cylindrical in form and disposed with its axis coincident with the axis of the trunnions 13 and 14. Through the trunnion 13 extends, axially, a shaft opening 23 into the opening 20 and slightly beyond the same, said shaft opening 23 being smaller in diameter than the diameter of the opening 20. Journaled in the opening 23 is the die bottom actuating shaft 24 which is provided within the opening 20 with a cam projection 25 extending outwardly toward the front of the machine and substantially to the wall of the opening 20 at said front. For the purpose of preventing rotation of the shaft 24 the arm 26 is provided, which arm is fixedly attached to a fixed portion of the machine, as for instance to the bearing 15 as shown in Fig. 1, and has non-rotatable fixed connection with the shaft 24. It will thus be apparent that the die block 12 may rotate with its trunnions 13 and 14 while the shaft 24 remains non-rotatable. The bars 19, when the lugs 21 are at the inner limits of the recesses 22, extend slightly into the opening 20, as will be seen from an inspection of Fig. 6. As the die block 12 is rotated in the direction of the arrow shown in Fig. 6 the bars 19, one after another, will be brought into engagement with the fixed cam projection 25, the cam face of which is so formed as to throw each bar 19 to its extreme outer limit in moving from the upper horizontal position under the upper die to the forward vertical position. The bars 19 are so mounted in the block 12 as not to slide in and out of said block with much freedom. When each bar has been projected forwardly at the front of the machine it will remain in the projected position as it passes down through the lower horizontal position and upwardly through the rear vertical position and will even retain its projected position after it has been brought up to the upper horizontal position again. The purpose of this will hereinafter more fully appear.

The trunnion 13 is provided at its end, beyond the side frame 1, with four ratchet lugs 27 equi-distantly arranged about said trunnion. The rod 28 is vertically slidably mounted in the arms 29 and 30 which are connected to the side frame 1, the arm 30 being adapted to permit the rod 28 to swing laterally in a plane perpendicular to the axis of the trunnion 13. The lower end of the rod 28 extends under the trunnion 13 and is provided with a terminal hook 31 adapted to engage one of the ratchet lugs 27 when said lug 27 has reached a point perpendicularly under the axis of the trunnion 13. For the purpose of normally holding the lower end of the rod 28 over against the trunnion 13 a spring 32 is provided which spring is fixedly connected to the side frame 1 and bears against the rod 28. For the purpose of preventing the rod 28 from dropping too low a stop collar 33 is fixedly arranged on said rod above the arm 29, and a similar collar 34 may be arranged below the arm 30, if desired, to prevent the rod 28 from being displaced upwardly. Near the upper end of the rod 28 a fixed lug 35 on said rod extends inwardly toward the shaft 10, and a radial arm 36 fixedly connected to the end of the shaft 10 is adapted to engage said lug 35 as the shaft 10 rotates in the direction indicated by the arrow in Fig. 2. It will be noted that the arm 36 is provided with an integral projection 37 which has a squared engaging face adapted to positively engage the lug 35. From the outer limit of the projection 37 the end of the arm 36 is rounded as shown in Fig. 2, thus forming a cam face on the outer end of said arm. When the projection 37 engages the lug 35 and the shaft 10 continues to rotate the rod 28 will be lifted vertically until the cam face on the end of the arm 36 has been brought into position, by the rotation of the shaft 10, to bear against the rod 28. By the further rotation of the shaft 10 said cam face will so bear against the rod 28 as to spring it back and away from the shaft 10, thus releasing the lug 35 from the projection 37 and permitting the rod 28 to drop to its lowermost position shown in Fig. 2. The collar 34 should be so located upon the rod 28 that said collar will engage the arm 30 when the rod 28 has been lifted to the point where the projection 37 should be released from the lug 35. If for any reason the disengagement of said projection from said lug should not take place at the proper instant, the collar 34, having come into engagement with the arm 30, will resist further upward movement of the rod 28 and will thus tend to force the disengagement of the projection 7 and the lug 35, as will be readily understood. By the upward movement of the rod 28, just described, the lower end of the rod will be moved upwardly and outwardly, carrying with it in its movement the trunnion 13 to which the hook 31 is connected by its engagement with the lug 27. The spring 32 will permit the rod not only to slide vertically but also to move laterally so as to allow for the movement of the end of the rod 28 through a quarter of a circle with the trunnion 13, as will be understood. In this way, for every complete revolution of the shaft 10 the block 12 will be rotated one quarter of a complete revolution, the purpose of which movement will more readily appear as the description proceeds.

Fixedly connected to the side frames 1 and 2 are the vertical guide ways 38 to which is slidably connected the plunger cross head 39, the guide ways 38 being adapted to guide said cross head in a true and accurate manner upwardly and downwardly. Connected to said cross head on the underside thereof is the upper die 40 adapted to form the contour of the upper side of the plate and adapted to co-act with any one of the lower dies upon the die block. The upper die 40 is provided with a downwardly projectable bottom 41 which is normally held in its retracted position, as shown in Fig. 1, by retaining springs 42. In the body of the die 40 an aperture 43 opens from the top surface of said die to said bottom 41 and upon a pin 44 extending across said aperture is pivotally mounted the tripping lever which is provided with a short right angled foot portion 45, with an upwardly extending portion 46 and with a laterally extending portion 47. The portion 47 extends to one of the vertical members of the side frame 1 and upon said vertical member is pivotally mounted at 48 a catch 49 provided with a hook portion adapted to engage the end of the portion 47 when the upper die is in its lowermost position. The catch 49 is held in engagement with the portion 47 by means of a spring 50 bearing against said catch, said spring being fixedly connected to the side frame 1. When the upper die is raised from its lowermost pressing position the catch 49, engaging the end of the portion 47, will pivotally move the tripping lever upon the pin 44 so as to throw the foot portion 45 into engagement with the bottom 41 and force the same, against the tension of the springs 42, downwardly, thus projecting the bottom outward from the body of the upper die, as illustrated in Fig. 2. As the upper die moves upwardly the tripping lever will be pivotally moved more and more upon the pin 44, until said upper die has moved several inches upwardly, the angle of the portion 47 with relation to the catch 49 will be such that the end of the portion 47 will slip away from the catch 49, whereupon the springs 42, drawing the bottom 41 upwardly, will restore said bottom to its normal retracted position illustrated in Fig. 1, thus throwing the tripping lever back into normal position, whereupon the end of the portion 47 will again be engaged by the catch 49 when the upper die returns to its lowermost position.

For the purpose of vertically reciprocating the upper die the plunger operating head 51, with its associated mechanism, is provided. Said head is preferably made in the form of a flat metallic plate provided with the rounded top portion 52, and connected at its bottom side with the plunger rods 53 which are adjustably connected to the cross head 39 for the purpose of adjusting the cross head 39 upwardly and downwardly with relation to said rods 53 for the purpose of varying the distance within which the upper die may approach the lower die in accordance with the particular work to be done upon the press. The head 51 is provided in its central portion with a vertically disposed slot 54 of sufficient width to permit the shaft 10 to pass therethrough, the sides of said slot being adapted to engage the sides of said shaft to steady the head in its vertical reciprocating movements now to be explained. On one side of the head 51 an upper curved supporting ledge 55 is provided, the inner surface of which is traced by a radius extending from the axis of the shaft 10 when at the lower end of the slot 54. Said supporting ledge extends only from the point 56 to the point 57. From a point below the slot 54 and extending to one side and upwardly toward the end 57 of the supporting ledge 55 is the lower pressing ledge 58, the inner curved surface of which is eccentric with reference to the axis of the shaft 10 when said shaft is in the upper part of the slot 54, the eccentricity of said ledge 58 being for the purpose hereinafter disclosed. On the opposite side of the head 51 from that upon which the ledge 55 is arranged is the lifting ledge 59, which is similar to the ledge 55 except that the radius by which its inner surface is struck is greater than the radius for the ledge 55, and the ledge 59 is longer than the ledge 55, extending from the point 60 to the point 61.

The shaft 10 is provided with a short sustaining and pressing arm 62 on the side of the head 51 on which the ledge 55 is arranged and with a longer lifting arm 63 on the side of the head 51 on which the ledge 59 is arranged. The arms 62 and 63 are offset from each other so that as the shaft 10 rotates in the direction indicated by the arrow in Fig. 10 the arm 63 will lead the arm 62 in rotation.

The head 51, as described, being arranged upon the shaft 10 intermediate the arms 62 and 63 and the shaft 10 rotated in the direction indicated by the arrows in Figs. 3, 4, 5 and 10 it will be noted that when the parts are in the positions illustrated in Fig. 3 the arm 63 will be perpendicularly disposed and will sustain the head 51 in its extreme upper position by the engagement of said arm 63 with the ledge 59. At the time when the arm 63 is in said vertical position the arm 62 will enter into engagement with the ledge 55 and although the arm 63 may subsequently pass out of engagement with the ledge 59 the arm 62 will sustain the head 51 in its upper position until said arm 62 has passed beyond the point 57. At the time when the arm 62 passes beyond the point 57 the head 51 will be permitted to immediately drop, carrying with it the plunger rods 53, the cross head 39, and the upper die. Said head 51 will drop until the upper die comes into contact with the clay on the lower die which is at the time under the upper die as will be described in more detail hereinafter. When said upper die comes into the contact with said clay the position of the shaft 10 in the slot 54 will be very near the top limit of said slot and immediately following the drop of said head the arm 62 will come into contact with the eccentric inner surface of the pressing ledge 58. Continuing in its rotation the shaft 10 will carry the arm 62 downwardly along said eccentric face of the ledge 58, producing a firm downward, constantly increasing pressure upon the clay between the lower and upper dies, which pressure may be regulated as to its intensity by means of the adjustable connection between the rods 53 and the cross head 39. Said pressure will continue until the arm 62 has passed beyond its lowermost vertical position, when said arm 62 will move out and away from the ledge 58, at which time the arm 63 on the opposite side of the head 51 will engage the lifting ledge 59, and the arm 63 being of relatively greater length the head 51 will be quickly lifted by the further movement of the arm 63 into the extreme upper position illustrated in Fig. 3. Said upper position will be maintained by the arm 63 until the position shown in Fig. 3 is assumed, when the arm 62 will again come into contact with the ledge 55, and the cycle of operation just described will be repeated.

By the operation of the mechanism just described it will be understood that the head 51 with the attached upper die will be held in its extreme upper position for a relatively long space of time, when said head and die will be suddenly dropped into engagement with the clay on the lower die, whereupon a heavy pressure downwardly upon said clay will be immediately produced, and the head 51 and upper die then quickly raised again to the extreme upper position. It will be noted that this operation is particularly adapted for the proper working of the clay by the upper and lower dies.

It should be noted that the disposition of the radial arm 36 on the shaft 10 is such that during the time when the head 51 is maintained in its extreme upper position the die block 12 is rotated by the operation of the rod 28 as hereinbefore described. At the time when the head 51 and upper die are permitted to drop and during the time when the downward pressure is exerted by the upper die upon the clay the die block 12 remains stationary.

A device of the character described being provided the operation of the same is as follows. A bat of stiff mud having been prepared is thrown against the rear vertically disposed lower die, the bottom 18 of the same being in the same projected position as illustrated in Fig. 6. This should preferably be done at the time when the die block 12 begins its rotation to carry said rear vertically disposed lower die up into the upper horizontal position under the upper die. The lower die with said bat arranged thereon having arrived in the said upper horizontal position the upper die will be dropped upon said bat as hereinbefore described, causing the bottom 18 of the lower die to be moved down into proper position, any air underneath said bat being driven out at the same time through the crevices around the edge of said bottom 18. In this way all blisters or other troubles caused by air between the bat and the lower die are prevented. At the time that the upper die drops onto the bat it will be understood that the bottom 41 is in the retracted position illustrated in Fig. 1 and as the pressure is brought to bear upon said upper die the clay will be firmly pressed between the lower and upper dies to form the proper contour of the finished article. At the same time the catch 49 will engage the end of the portion 47, and as the upper die is quickly lifted by the action of the lifting arm 63 the said catch 49 will cause the bottom tripping lever to be pivotally moved upon the pin 44. The upper die will be moved but slightly upward when the catch 49 will release from the portion 47, whereupon the bottom 41 will quickly assume its retracted position, leaving the upper surface of the finished article free. The die block will then be rotated by the rod 28 and as the lower die with the formed article thereon moves forwardly the cam projection 25 will push the bar 19 outwardly, thus projecting the bottom 18 and moving the finished article out away from the main portion of the bottom die into the position illustrated on the front side in Fig. 6. When the article is in this position an attendant, grasping the same by the freed edges thereof, may readily lift the same from the bottom 18 and dispose of the article as may be desired. At the time when the finished article has been moved from the upper position to the forward position a second bat has been placed upon that lower die which at such time moves from the rear position into the upper position, and the operation of pressing is repeated. In this manner, one attendant placing bats upon the lower dies for pressing, and the other attendant removing the formed ware from the dies at the front of the machine will produce a continuous and rapid production of earthenware objects from stiff mud.

While the description hereinbefore given has referred principally to the manufacture of plates and similar articles, it should be borne in mind that my invented press is equally intended and adapted for the production of other articles, being capable of producing articles of hollow ware, or such articles as jugs and the like by making the same in sections or parts and uniting the same after they have been formed upon the press. To more fully illustrate the manner in which such articles may be made upon the press I have shown in Fig. 7 a sectional view through an upper and lower die adapted for the making of the one-half of a stone-ware jug. It will be noted that the parts are very similar to the parts used in the making of plates and like articles and operate in substantially the same manner and the sections or parts of said jug thus produced may be united, as shown in Figs. 8 and 9, producing a single jug from two united sections.

From the above it will be seen that my invented earthenware press is adapted to a large number of uses in the production of earthenware articles by the stiff mud process. It will be understood that said press may be applied to the production of any sort of articles by said process and it will also be understood that various changes in the form and construction of the device may be made without departing from the spirit of the invention.

I claim:—

In a press of the character described a die-operating head provided with a slot, an outstanding supporting ledge and an outstanding, eccentric, pressing ledge on one side of said head and an outstanding lifting ledge on the opposite side of said head, a shaft provided with a sustaining and pressing arm and with a spaced, offset, lifting arm, said head mounted upon said shaft between said arms, said sustaining and pressing arm adapted for engagement with said supporting ledge and said pressing ledge and said lifting arm adapted for engagement with said lifting ledge, said head adapted for reciprocating movement transverse to the axis of said shaft.

In testimony that I claim the above, I have hereunto subscribed my name in the presence of two witnesses.

EUGENE L. JESTER.

Witnesses:
WILLIAM H. MILLER,
IRENE LUTZ.